United States Patent
Kumar et al.

(10) Patent No.: US 11,729,395 B2
(45) Date of Patent: Aug. 15, 2023

(54) METHODS AND DEVICES FOR EXTRACTING MOTION VECTOR DATA FROM COMPRESSED VIDEO DATA

(71) Applicants: Sheral Sweta Kumar, London (CA); Amartya Mukherjee, Waterloo (CA); Seel Nimeshkumar Patel, Windsor (CA); Rui Xiang Chai, Waterloo (CA); Wentao Liu, Maple (CA); Yuanhao Yu, Markham (CA); Yang Wang, Winnipeg (CA); Jin Tang, Markham (CA)

(72) Inventors: Sheral Sweta Kumar, London (CA); Amartya Mukherjee, Waterloo (CA); Seel Nimeshkumar Patel, Windsor (CA); Rui Xiang Chai, Waterloo (CA); Wentao Liu, Maple (CA); Yuanhao Yu, Markham (CA); Yang Wang, Winnipeg (CA); Jin Tang, Markham (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/535,840

(22) Filed: Nov. 26, 2021

(65) Prior Publication Data
US 2023/0171407 A1    Jun. 1, 2023

(51) Int. Cl.
*H04N 19/44* (2014.01)
*H04N 19/513* (2014.01)
(Continued)

(52) U.S. Cl.
CPC ........ *H04N 19/146* (2014.11); *H04N 19/137* (2014.11); *H04N 19/176* (2014.11); *H04N 19/186* (2014.11); *H04N 19/85* (2014.11)

(58) Field of Classification Search
CPC .. H04N 19/146; H04N 19/137; H04N 19/176; H04N 19/186; H04N 19/85
(Continued)

(56) References Cited

U.S. PATENT DOCUMENTS

| | | | |
|---|---|---|---|
| 10,672,098 B1 * | 6/2020 | Chemparathy | .......... G09G 5/39 |
| 2007/0030276 A1 * | 2/2007 | MacInnis | ................. H04N 9/75 |
| | | | 345/505 |

(Continued)

FOREIGN PATENT DOCUMENTS

| | | | | |
|---|---|---|---|---|
| CN | 103596013 A | * | 2/2014 | |
| WO | WO-2005088983 A2 | * | 9/2005 | ........... H04N 19/103 |

(Continued)

*Primary Examiner* — Albert Kir (57) ABSTRACT

Devices and methods for extracting motion vector data during decoding compressed of video data are described. At a video decoder, an encoded video data for a frame of video from an input buffer is obtained. The encoded video data is decoded to obtain decoded image data for a decoded frame, where the decoding includes extracting corresponding motion vector data for the decoded frame. The decoded image data is stored in a temporary storage indexed with a given index, and the corresponding motion vector data is stored in a same or different temporary storage indexed with the given index. An output buffer indexed with the given index is filled with the decoded image data and the corresponding motion vector data stored in the respective temporary storage indexed with the given index.

20 Claims, 7 Drawing Sheets

(51) Int. Cl.
*H04N 19/146* (2014.01)
*H04N 19/137* (2014.01)
*H04N 19/176* (2014.01)
*H04N 19/186* (2014.01)
*H04N 19/85* (2014.01)

(58) Field of Classification Search
USPC .................................................. 375/240.02
See application file for complete search history.

(56) References Cited

U.S. PATENT DOCUMENTS

| | | | |
|---|---|---|---|
| 2007/0204318 A1* | 8/2007 | Ganesh .............. | H04N 21/4302 |
| | | | 375/E7.093 |
| 2019/0045203 A1* | 2/2019 | Varadarajan ........... | H04N 19/42 |
| 2020/0128237 A1* | 4/2020 | Xu ....................... | H04N 19/105 |
| 2021/0014524 A1* | 1/2021 | Rusanovskyy ........ | H04N 19/52 |

FOREIGN PATENT DOCUMENTS

| | | | | |
|---|---|---|---|---|
| WO | WO-2021142246 A1 * | 7/2021 | ............. | H04N 19/44 |
| WO | WO-2021202104 A1 * | 10/2021 | ........... | H04N 19/105 |

\* cited by examiner

METHODS AND DEVICES FOR EXTRACTING MOTION VECTOR DATA FROM COMPRESSED VIDEO DATA

FIELD

The present disclosure relates to methods and devices for processing compressed video data, in particularly relates to extract motion vector data from compressed video data and to make such data available for use by other software applications.

BACKGROUND

Conventionally, video data is typically saved and/or transmitted as compressed data (e.g., in the format of compressed bit streams) for more efficient use of storage resources and network bandwidth. In a typical compressed video stream, only a few frames (referred to as key frames) have their complete image data encoded in the compressed data, while other frames (referred to non-key frames) are only encoded as difference information with respect to another frame (referred to as a reference frame). Many existing video encoders use motion vectors and reconstruction residuals to represent the frame difference information. The information that is encoded in the compressed data, and that may not be in the original uncompressed data, may be referred to as compressed domain information. Motion vectors are an example of compressed domain information. Motion vectors encode motion information and block-level correspondence between two frames. Typically, motion vectors are only utilized for reconstructing non-key frames when compressed video data is decoded into uncompressed video data, after which the motion vectors are discarded. As such, this motion vector information is not accessible to other software applications.

Existing computer vision software applications (e.g., machine learning-based video understanding software applications) typically use decoded (i.e., uncompressed) video frames as input. However, this approach can be time consuming and/or computationally expensive due to the large amount of data inherent in a decoded video. This may limit the practical uses of many computer vision applications, for example preventing such software applications from being implemented on devices with limited computing power such as end user devices (e.g., smartphones).

Accordingly, there is a need to enable motion vector data from compressed video data to be made accessible and useable, such as for input to computer vision models.

SUMMARY

In various examples, the present disclosure describes methods and devices that enable motion vector data to be made accessible and usable to software applications (including computer vision applications) outside of the video decoder. In particular, examples of the present disclosure enable implementation in electronic devices (e.g., smartphones, tablets or other mobile devices) that operate using a system framework that require buffers to pass decoded/encoded video data between higher and lower levels of system architecture.

The present disclosure provides examples that enable implementation on existing system frameworks. The present disclosure describes examples of a video decoder, in which motion vector data is saved rather than discarded. The motion vector data is outputted to an output buffer together with the corresponding decoded image data, to enable the motion vector data (together with the corresponding decoded image data) to be passed from a lower level of the system architecture (where the video decoder resides) to a higher level (where other software applications, such as computer vision applications, reside). This provides the technical advantage that motion vector data, which would otherwise be inaccessible to higher level software applications, is made accessible and useable by higher level software applications. The motion vector data and decoded image data are also stored in a temporary storage of the video decoder in a way that ensures the motion vector data is outputted to the output buffer together with the correct corresponding decoded image data.

By making such motion vector data useable by a higher level computer vision application, the resources (e.g., processing power, memory resources, etc.) required to execute the computer vision application to perform a computer vision task (e.g., a video understanding task) may be reduced. This may have the technical effect that computer vision applications may be practically executed on electronic devices having limited resources (e.g., on mobile devices such as smartphones, tablets, etc.).

In some examples, the present disclosure also describes an output buffer that is defined to have storage space for storing the decoded image data together with the corresponding motion vector data. A possible data layout for storing the data in the output buffer is also described. This provides the technical advantage that a practical way to pass the motion vector data with its corresponding decoded image data from a lower level to a higher level of the system is enabled. Further, such an output buffer can be implemented within existing system architectures.

In some examples, the present disclosure also describes an example software interface definition, which may enable motion vector data to be more easily accessible and useable by higher level software applications (including computer vision applications). This may provide the technical advantage that the motion vector data is provided in a data format that is recognizable and useable by higher level applications.

In an example aspect, the present disclosure describes an electronic device, including a non-transitory memory; and a processing unit configured to execute instructions stored in the memory to cause the device to: obtain, at a video decoder, encoded video data for a frame of video from an input buffer; decode, using the video decoder, the encoded video data to obtain decoded image data for a decoded frame, wherein the decoding includes extracting corresponding motion vector data for the decoded frame; store, using the video decoder, the decoded image data in a temporary storage indexed with a given index, and store, using the video decoder, the corresponding motion vector data in a same or different temporary storage indexed with the given index; and fill, using the video decoder, an output buffer indexed with the given index with the decoded image data and the corresponding motion vector data stored in the respective temporary storage indexed with the given index.

In an example of the preceding example aspect of the device, the output buffer may be defined to have storage space for storing the decoded image data together with the corresponding motion vector data.

In an example of the preceding example aspect of the device, the corresponding motion vector data may include one or more motion vector data blocks each containing information for a respective motion vector for the decoded frame.

In an example of the preceding example aspect of the device, each motion vector data block may contain: a first block of motion vector x- and y-direction data; a second block of motion vector x- and y-position data; a third block of size data; and a fourth block of picture order count difference data.

In an example of any of the preceding example aspects of the device, the video decoder may be implemented at a first system level of the device, and the filled output buffer may be passed to a second system level of the device.

In an example of the preceding example aspect of the device, the processing unit may be configured to execute instructions stored in the memory to further cause the device to: obtain, at an interface component at the second system level, the filled output buffer; extract, using the interface component, the decoded image data and corresponding motion vector data for the decoded frame from the filled output buffer; preprocess, using the interface component, the decoded image data and corresponding motion vector data; and provide, after the preprocessing, the decoded image data and corresponding motion vector data to a software application.

In an example of the preceding example aspect of the device, preprocessing the decoded image data and corresponding motion vector data may include: preprocessing the decoded image data from YUV format to RGB format; and preprocessing the corresponding motion vector data into matrix format.

In an example of any of the preceding example aspects of the device, the processing unit may be configured to execute instructions stored in the memory to further cause the device to: obtain, at the interface component, a compressed video file containing the encoded video data; fill, using the interface component, the input buffer with the encoded video data; and pass the filled input buffer to the video decoder at the first system level of the device.

In an example of any of the preceding example aspects of the device, the decoded image data and corresponding motion vector data may be provided to a computer vision application.

In an example of any of the preceding example aspects of the device, the device may be a mobile device.

In another example aspect, the present disclosure describes a method, at an electronic device, including: obtaining, at a video decoder of the electronic device, encoded video data for a frame of video from an input buffer; decoding, using the video decoder, the encoded video data to obtain decoded image data for a decoded frame, wherein the decoding includes extracting corresponding motion vector data for the decoded frame; storing, using the video decoder, the decoded image data in a temporary storage indexed with a given index, and storing, using the video decoder, the corresponding motion vector data in a same or different temporary storage indexed with the given index; and filling, using the video decoder, an output buffer indexed with the given index with the decoded image data and the corresponding motion vector data stored in the respective temporary storage indexed with the given index.

In an example of the preceding example aspect of the method, the output buffer may be defined to have storage space for storing the decoded image data together with the corresponding motion vector data.

In an example of the preceding example aspect of the method, the corresponding motion vector data may include one or more motion vector data blocks each containing information for a respective motion vector for the decoded frame.

In an example of the preceding example aspect of the method, each motion vector data block may include: a first block of motion vector x- and y-direction data; a second block of motion vector x- and y-position data; a third block of size data; and a fourth block of picture order count difference data.

In an example of any of the preceding example aspects of the method, the video decoder may be implemented at a first system level of the device, and the filled output buffer may be passed to a second system level of the device.

In an example of the preceding example aspect of the method, the method may include: obtaining, at an interface component at the second system level, the filled output buffer; extracting, using the interface component, the decoded image data and corresponding motion vector data for the decoded frame from the filled output buffer; preprocessing, using the interface component, the decoded image data and corresponding motion vector data; and providing, after the preprocessing, the decoded image data and corresponding motion vector data to a software application.

In an example of the preceding example aspect of the method, preprocessing the decoded image data and corresponding motion vector data may include: preprocessing the decoded image data from YUV format to RGB format; and preprocessing the corresponding motion vector data into matrix format.

In an example of any of the preceding example aspects of the method, the method may include: obtaining, at the interface component, a compressed video file containing the encoded video data; filling, using the interface component, the input buffer with the encoded video data; and passing the filled input buffer to the video decoder at the first system level of the device.

In an example of any of the preceding example aspects of the method, the decoded image data and corresponding motion vector data may be provided to a computer vision application.

In another example aspect, the present disclosure describes a non-transitory computer readable medium having instructions stored thereon. The instructions, when executed by a processing unit of an electronic device, cause the electronic device to: obtain, at a video decoder of the electronic device, encoded video data for a frame of video from an input buffer; decode, using the video decoder, the encoded video data to obtain decoded image data for a decoded frame, wherein the decoding includes extracting corresponding motion vector data for the decoded frame; store, using the video decoder, the decoded image data in a temporary storage indexed with a given index, and store, using the video decoder, the corresponding motion vector data in a same or different temporary storage indexed with the given index; and fill, using the video decoder, an output buffer indexed with the given index with the decoded image data and the corresponding motion vector data stored in the respective temporary storage indexed with the given index.

In an example of the preceding example aspect of the computer readable medium, the instructions, when executed by a processing unit of a system, may cause the system to perform any of the preceding example aspects of the method.

In another example aspect, the present disclosure describes a computer program including instructions which, when the program is executed by a computer, cause the computer to carry out any of the preceding example aspects of the method.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DETAILED DESCRIPTION

There has been interest in using motion vector data from compressed video streams to help improve the efficiency of computer vision (CV) applications (e.g., computer vision applications performing video understanding tasks). Motion vector data is already encoded in a compressed video stream thus does not incur additional processing overhead to generate this data. Further, motion vector data represents motion information, which is often useful for video-based CV tasks. Conventional CV applications that do not make use of motion vector data would need to perform computations to estimate this motion information, which can be computationally expensive and/or inefficient. Motion vector data also provides information about correspondence between two similar frames. By making motion vector data available to a CV application, it may not be necessary to perform additional computations to infer this correspondence information.

Figure 2:
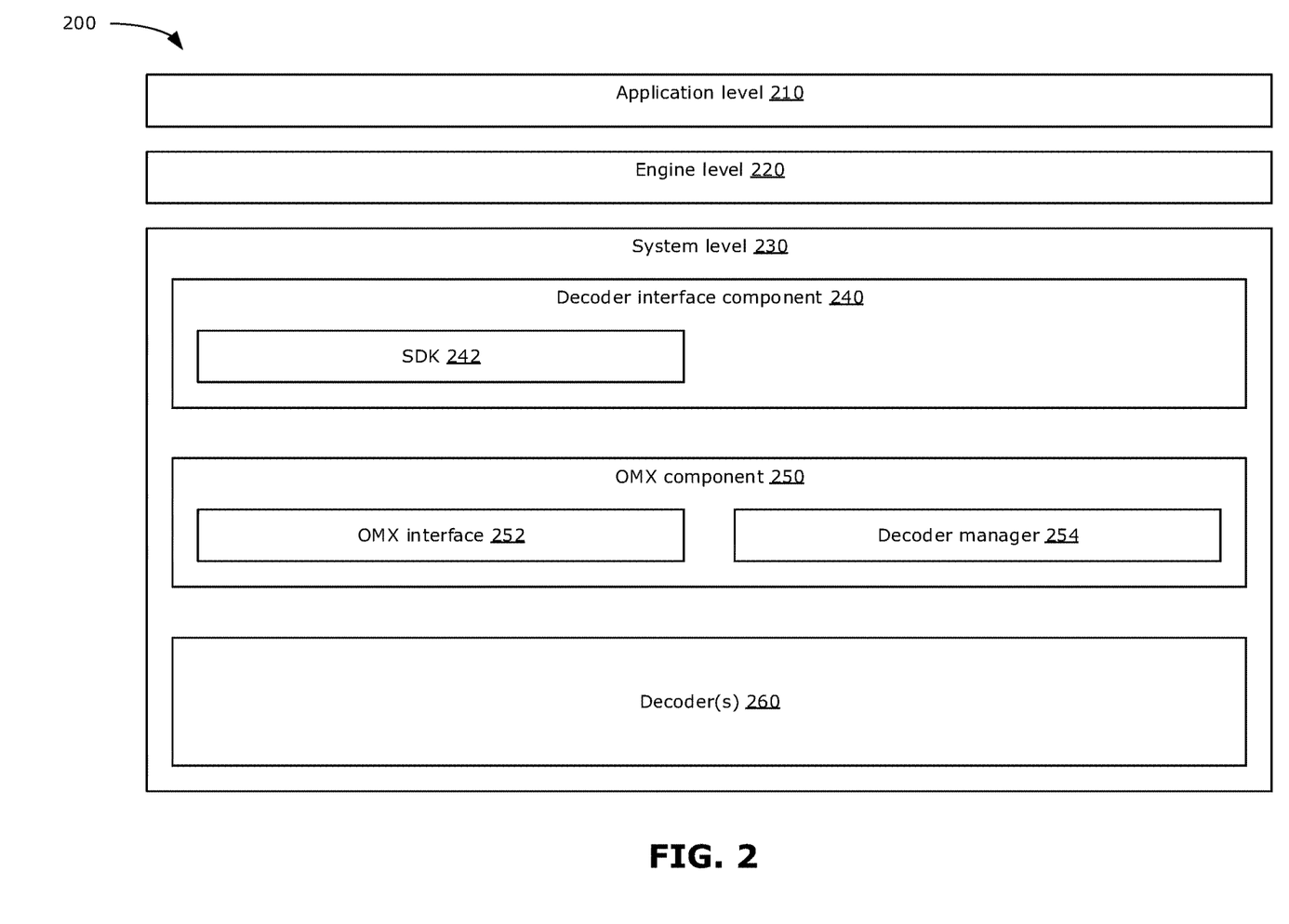
FIG. 2 is a block diagram illustrating an example simplified system framework for video decoding, which may be implemented on the electronic device of FIG. 1.

There has been interest on the high-level concept of using motion vector data or extraneous video data to simplify and accelerate the execution of CV applications. However, there remains a need for a practical, technical framework for making motion vector data accessible and useable to CV applications (or any other software application). Further, there remains a need to provide a practical solution that can be implemented on electronic devices having specific system requirements. For example, smartphones that use an operating system (OS) which provides video decoding as a system-level service may require solutions that are compatible with a specific video decoding framework. For example, many existing smartphones use video decoders that are integrated in a framework (e.g., as illustrated by FIG. 2) that logically separates the system level where the video decoder resides from the system level where more software applications reside (e.g. CV applications) in a way that prevents the application at one system level from directly accessing data from the video decoder at another system level. There are technical and non-trivial factors that must be considered, to enable practical implementation on such devices.

To assist in understanding the present disclosure, an example electronic device is first described.

Figure 1:
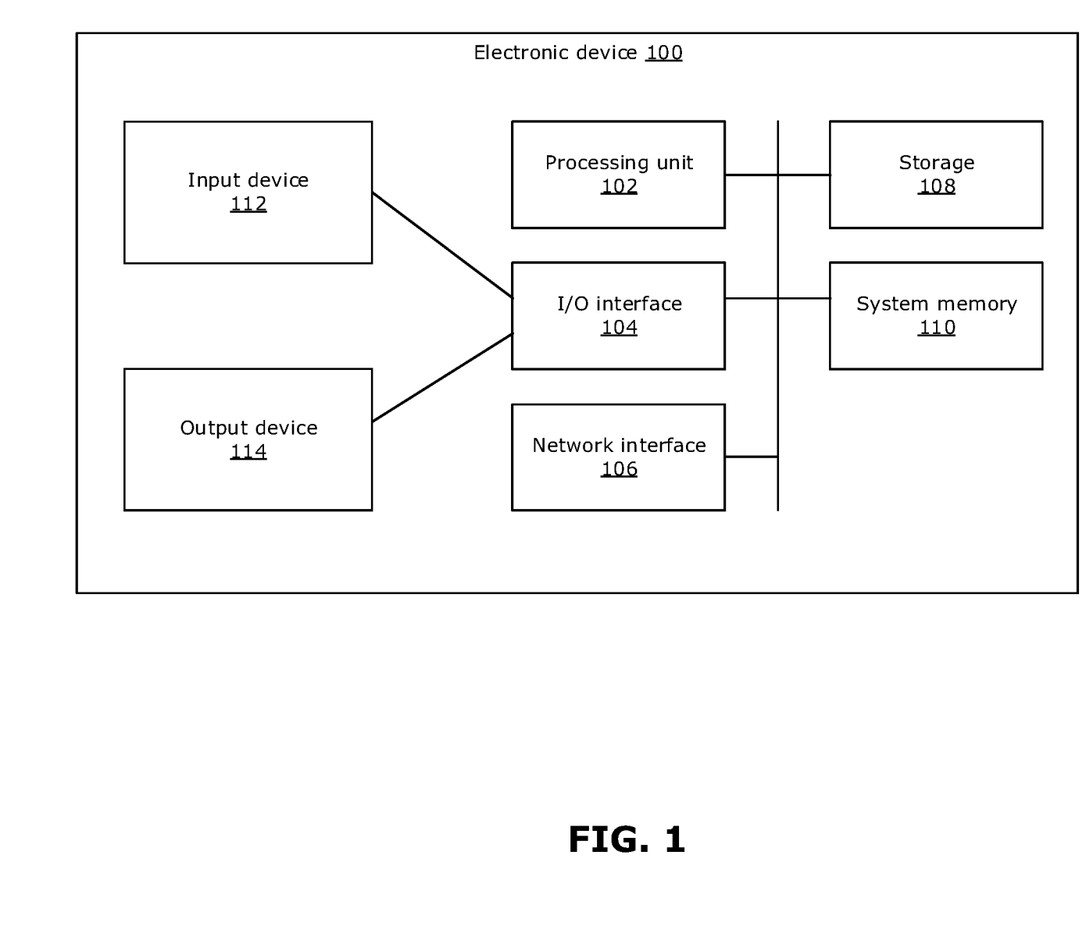
FIG. 1 is a block diagram illustrating an example electronic device, which may be used to implement examples of the present disclosure.

FIG. 1 is a block diagram of an example electronic device 100 that may be used to implement examples disclosed herein. For example, the electronic device 100 may be an end user device such as a tablet, a smartphone, a mobile device, etc. Other electronic devices suitable for implementing examples described in the present disclosure may be used, which may include components different from those discussed below. Although FIG. 1 shows a single instance of each component, there may be multiple instances of each component in the electronic device 100.

In this example, the electronic device 100 includes a processing unit 102, which may include a processor, a microprocessor, an application-specific integrated circuit (ASIC), a field-programmable gate array (FPGA), a dedicated logic circuitry, or combinations thereof. The electronic device 100 may also include an input/output (I/O) interface 104, to enable interfacing with one or more input devices 112 and/or output devices 114. The input device(s) 112 (e.g., a keyboard, a mouse, a microphone, a touchscreen, and/or a keypad) and output device(s) 114 (e.g., a display, a speaker and/or a printer) are shown as a component of the electronic device 100. In other examples, one or more of the input device(s) 112 and/or the output device(s) 114 may be an external component that may be coupled to the electronic device 100.

The electronic device 100 in this example also includes a network interface 106, which may enable the electronic device 100 to receive and transmit communications over a network (e.g., over a wired network or a wireless network).

The electronic device 100 includes one or more storage units 108, which may include a mass storage unit such as a solid state drive, a hard disk drive, a magnetic disk drive and/or an optical disk drive. The electronic device 100 also includes a system memory 110, which may include a volatile or non-volatile memory (e.g., a flash memory, a random access memory (RAM), and/or a read-only memory (ROM)). The system memory 110 and/or the storage 108 may store instructions for execution by the processing unit 102. For example, the system memory 110 and/or the storage 108 may include software instructions, such as for implementing an OS, and other applications/functions. In some examples, instructions may also be provided by an external memory (e.g., an external drive in wired or wireless communication with the electronic device 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

FIG. 2 is a block diagram illustrating an example system framework 200 that may be executed on the electronic device 100. The example system framework 200 governs how software and hardware of the electronic device 100 communicate with each other, and how data is passed within the electronic device 100. FIG. 2 is a simplified illustration of an example system framework 200, focusing on details relevant to the present disclosure. Accordingly, it should be understood that some levels of the system framework 200 may have been omitted from FIG. 2.

Levels of the system framework 200 may be referred to as a "higher" level or a "lower" level of the system framework 200. In general, a higher level of the system framework 200 refers to operations and applications that are abstracted away from hardware functions, and end user applications (i.e., software applications that a user directly interfaces with, such as word processing applications, gaming applications, etc.) typically reside in a higher (or the highest) level of the system framework 200. A lower level of the system framework 200 refers to operations and applications that interact more closely with hardware components (e.g., hardware drivers, hardware processor, etc.) rather than end users. Generally, different levels of the system framework are logically separated from each other, such that applications at one level of the system framework 200 cannot access data from another level unless such data is explicitly passed between levels. Although the present disclosure refers to higher or lower system levels, it should be understood that any other terminology may be used to refer to such logically separated levels, such as first and second system levels, or logically separately system levels, among others. The system framework 200 in this example includes, at the highest level, an application level 210. Below the application level 210 is an engine level 220. Below the engine level 220 is the system level 230.

End user applications, such as those providing CV capabilities, reside at the higher application level 210. Middleware (i.e., software that provides services to other software), including CV engines such as feature warping engine, multimodal fusion engine or optical flow/saliency engine, reside in the engine level 220. Both higher level CV capabilities and lower level CV engines are considered to be CV applications in the present disclosure. Further, regardless of whether the software application resides in the application level 210 or in the engine level 220, such software applications are higher level than the system level 230.

One or more decoders 260 (including software decoders and/or hardware decoders) reside in the system level 230. Examples of decoders 260 include a video decoder that decodes compressed video data that has been compressed using the H.264 compression standard (simply referred to as a H.264 decoder), or a video decoder that decodes compressed video data that has been compressed using the H.265 compression standard (simply referred to as a H.265 decoder). There may be multiple different types of decoders 260 residing at the system level 230 on a single electronic device 100, which may enable the electronic device 100 to decode video data in different formats.

The electronic device 100 may operate using a system framework that may impose restrictions on how data from a decoder 260 may be accessed. The disclosed invention is based on a system that provides video decoding service using the framework in FIG. 2. In the framework in FIG. 2, a software or hardware video decoder 260 is abstracted as an instance of an OMX component 250, which has an input port and an output port. Associated with the input port, an array of input buffers is defined. Associated with the output port, an array of output buffer is defined. When the decoder 260 is executed (e.g., to decode compressed video data), a chunk of encoded video data is put into an input buffer, and the decoder 260 is triggered to read the filled input buffer. After decoding the chunk of encoded video data, the decoder 260 outputs the decoded image data to the output buffer. Note that the actual implementation of the decoder 260 may differ from one and another. However, when viewed from a higher system level, such as a decoder interface component 240, the behave is the same as described above regardless of the actual decoder 260 implemented. The decoder interface component 240 communicates with the OMX component 250 to enable data transfer between the application level 210 or engine level 220 and the low-level decoder 260. In particular, when there is an empty input buffer, the decoder interface component 240 may read the next chunk of encoded video data from an encoded video file into the input buffer, and pass the input buffer to the OMX component 250 through its input port. At the same time, the decoder interface component 240 may monitor the output port of the OMX component 250. After an output buffer is filled with decoded image data by the decoder 260, the decoder interface component 240 may pass the output buffer to an application program that may reside in the application level 210 or engine level 220 (e.g., an application for performing CV tasks, such as action recognition or video understanding). The decoder interface component may be also responsible for reading metadata and encoded video data from the encoded video file, instantiating a proper OMX decoder (i.e., the decoder 260 abstracted as an instance of the OMX component 250) according to the format of the encoded video and the requirement of the subsequent application program, initializing the OMX decoder using metadata of the encoded video, and destructing the instance of the OMX decoder when it is no longer needed. As described, data from the decoder 260 is accessible to higher layers through an OMX component 250 and a decoder interface component 240. The OMX component 250 also supports a decoder manager 254 that manages registration of the decoders 260. For example, an operating system (OS) based on the Android Open Source Project (AOSP) may use a video decoding framework conforming to the one described above.

A buffer system (not shown in FIG. 2) is used to store encoded and decoded data, and to pass data between the different levels of the system framework 200. For example, encoded data (e.g., compressed video data) is stored in an input buffer that is passed down to the lower level decoder 260. Decoded data from the decoder 260 is then stored in an output buffer that is passed up to be accessed by higher level software applications (e.g., CV engines in the engine level 220 and/or CV capabilities in the application level 210). Because higher level software applications cannot directly access data from lower level decoders 260, there is a non-trivial problem of how to expose motion vector data (which is extracted at the lower level decoder) to be accessible and useable by higher level software applications (e.g., CV applications).

Figure 3:
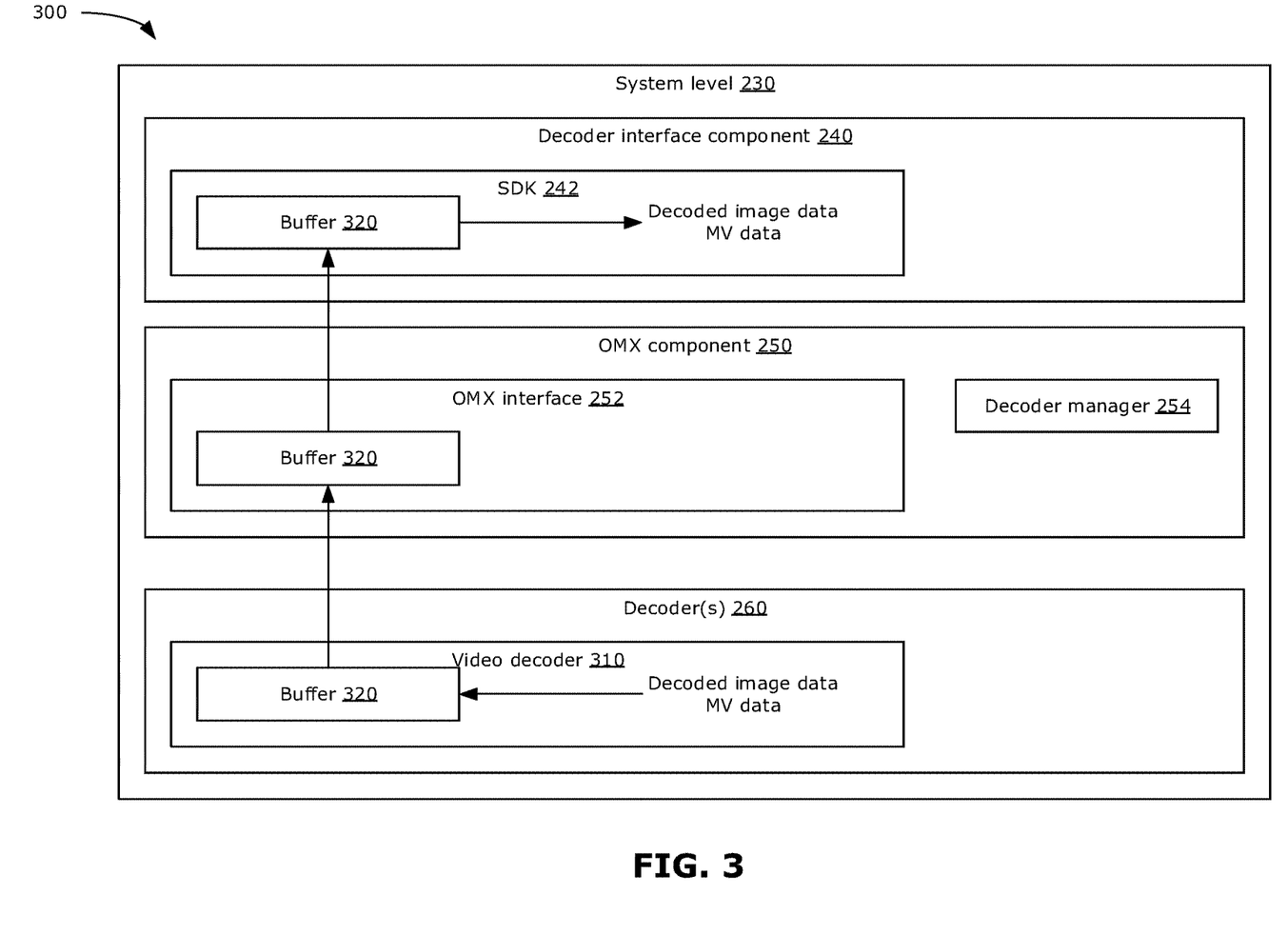
FIG. 3 is a block diagram illustrating certain details of an example of the disclosed framework for decoding video data, in accordance with examples of the present disclosure.

FIG. 3 is a block diagram illustrating an example of the disclosed framework 300, which enables motion vector data to be exposed to higher level software applications. FIG. 3 includes a dataflow illustrating how motion vector data may be extracted by the disclosed video decoder and passed up to higher levels.

The example framework 300 includes the application level 210, engine level 220 and system level 230 as previously discussed. However, the application level 210 and the engine level 220 have been omitted from FIG. 3 to avoid clutter.

The example framework 300 includes a video decoder 310, which may be similar to existing video decoders (e.g., H.264 or H.265 decoder) with additional functions that enable storing of motion vector data that would otherwise be discarded by a conventional video decoder. The example framework 300 also includes an output buffer 320 (or simply buffer 320), which is sized to enable storing of motion vector data. It should be noted that the example framework 300 may fit within the existing system framework 200, so that the framework 300 (including the disclosed video decoder 310 and buffer 320) may be implemented on an existing electronic device 100.

The video decoder 310 provides functions for defining the buffer 320, extracting motion vector data, and storing the extracted motion vector data to the buffer 320. The video decoder 310 (which may be a software decoder, a hardware decoder, or a combination of software and hardware decoder) may be registered with the decoder manager 254 (in accordance with the OMX framework) when first installed on the electronic device 100. When executed, the video decoder 310 may define the buffer 320 to include additional storage space (in addition to the storage space typically defined for storing decoded video data, such as decoded image data for a decoded frame) for storing motion vector data that is extracted during the decoding process. Because the buffer 320 has additional storage space compared to conventional output buffers, the buffer 320 as disclosed herein may be referred to as an expanded buffer 320. The buffer 320 may be defined and the necessary memory resources may be allocated when the video decoder 310 is first executed, for example.

Encoded (i.e., compressed) video data that requires decoding (i.e., decompression) by the video decoder 310 may be passed down to the video device 310 via an input buffer (not shown in FIG. 3). The video decoder 310 processes the encoded video data, including extracting motion vector data, to output decoded image data corresponding to decoded frames of video. In particular, the video decoder 310, unlike conventional decoders (such as conventional H.264 or H.265 decoders) performs operations to store motion vector data that is extracted during the decoding process into the output buffer 320. The video decoder 310 may perform operations to store extracted motion vector data as soon as the motion vector data has been extracted from the encoded video data, to avoid the motion vector data being lost in subsequent processing steps. As will be discussed further below, the video decoder 310 performs operations to ensure the motion vector data is stored with its corresponding decoded image data, so that the motion vector data can be properly extracted (and optionally formatted) from the buffer 320, when the data stored in the buffer 320 is accessed at the higher levels (e.g., by functions in the SDK 242).

The buffer 320 containing the decoded image data and corresponding motion vector data is passed up to the OMX interface 252 in the OMX component 350 and further up to the SDK 242 in the decoder interface component 240, where the decoded image data and motion vector data may be extracted from the buffer 320 (and optionally preprocessed) to be accessed and used by higher level applications (e.g., CV applications in the engine level 220 and/or the application level 210).

Figure 4:
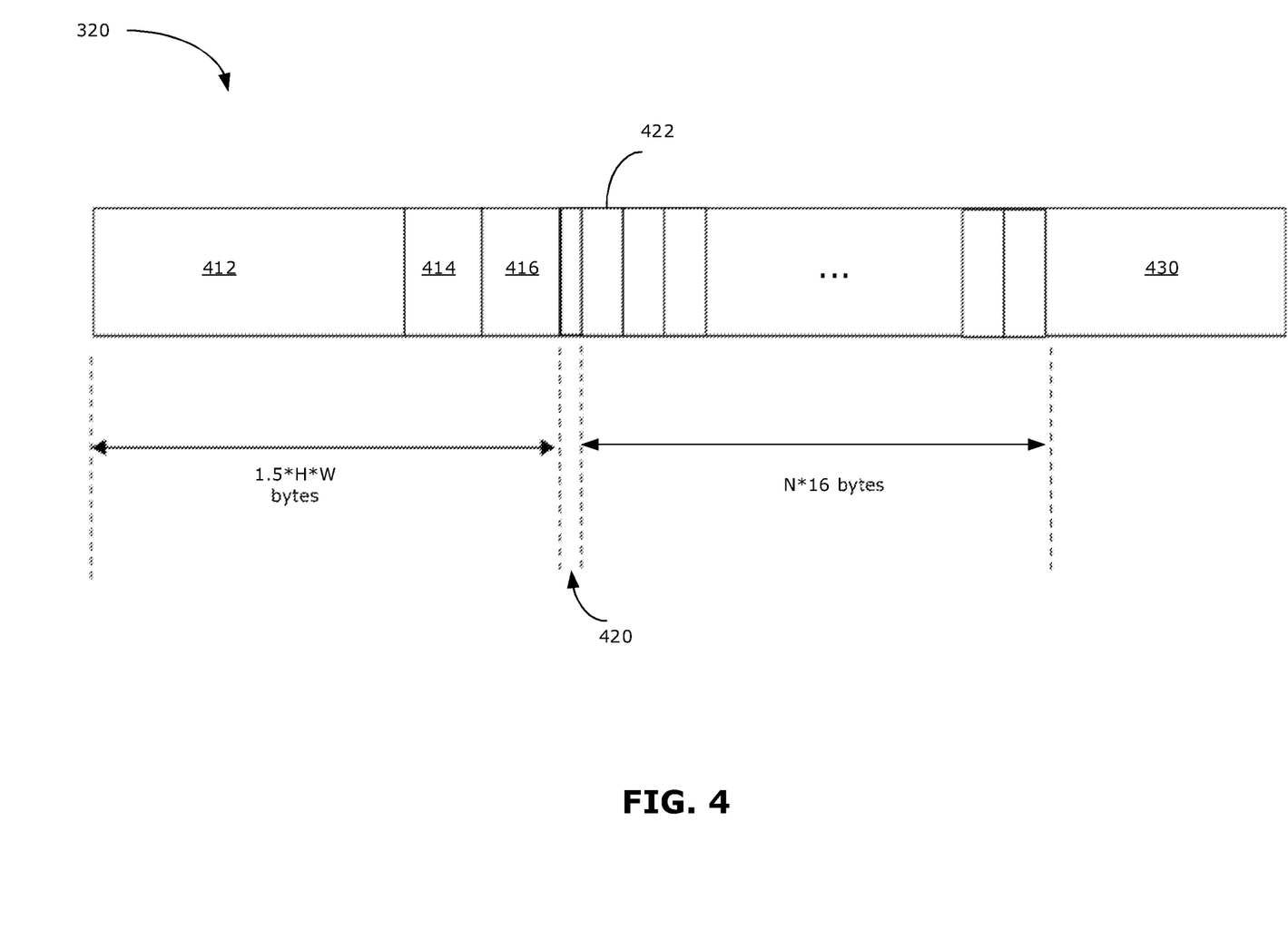
FIG. 4 illustrates an example buffer, which may be part of the example framework of FIG. 3, in accordance with examples of the present disclosure.

FIG. 4 illustrates an example buffer 320, which may be part of the disclosed framework 300. The size of the buffer 320 may be defined by the video decoder 310 in accordance with the present disclosure. Additionally, the video decoder 310 may be configured to store data in the buffer 320 according to a defined data layout. The data layout in the buffer 320 may be defined by the video decoder 310, and this data layout may also be known to data extraction functions in the SDK 242, so that data stored in the buffer 320 may be appropriately extracted (and optionally preprocessed). For example, a motion vector interface may be defined (e.g., as part of registering the video decoder 310) to enable recognition of the data layout between the video decoder 310 and the SDK 242.

The buffer 320 is used to store decoded image data (i.e., image data for a decoded frame of video) together with extracted motion vector data that has been outputted by the decoder 310, and to pass both the decoded image data and the motion vector data from the lower level decoder 310 to be accessed by higher level software applications. Compared to conventional buffers, the buffer 320 as disclosed herein is defined to have a buffer size that enables storing of the additional motion vector data.

The buffer 320 includes a first section that stores the decoded image data, specifically the Y channel data 412, U channel data 414 and V channel data 416 for a decoded frame (where the image data comprises Y, U and V data channels for each pixel). Typically, storing the YUV channel data 412, 414, 416 requires 1.5*H*W bytes of storage in the buffer 320, where H and W are the height and width in pixels, respectively, of the decoded frame. Conventional buffers are typically sized to accommodate only the YUV channel data 412, 414, 416.

The disclosed buffer 320 has an additional section that stores a motion vector count 420, indicating the number of motion vectors associated with the decoded frame. The number of motion vectors associated with a decoded frame may be defined by the video compression standard that was used to compress the video. For example, in accordance with the H.264 video compression standard, a motion vector may be computed for each 8×8 pixel block in a frame, such that a frame of size H*W may be divided into (H/8)*(W/8) blocks, each block having up to two motion vectors (one motion vector for x-direction motion, one motion vector for y-direction motion).

The disclosed buffer 320 further includes a third section, following the motion vector count 420 (where "following" refers to the order that the data is stored in memory), that stores the motion vector information in sequential motion vector data blocks 422. Each motion vector data block 422 corresponds to a respective motion vector associated with the decoded frame. The size of each motion vector data block 422 may be defined by the video compression standard. For example, in accordance with the H.264 video compression standard, each motion vector data block 422 may be 16 bytes in length. Thus, if there are N motion vectors associated with the decoded frame, the third section of the disclosed buffer 320 may occupy N*16 bytes.

Since a decoded frame, in accordance with the H.264 standard, may be divided into (H/8)*(W/8) blocks each having potentially two motion vectors, the buffer 320 may have an allocation of an extra (H/8)*(W/8)*2*16 bytes of space in order to store the motion vector data blocks 422 (plus a small allocation of space, such as four bytes, to store the motion vector count 420). Although the buffer 320 may be defined to accommodate the maximum number of motion vector data blocks 422 that can be associated with a given decoded frame, based on the video compression standard used, typically there are fewer motion vectors (and hence fewer motion vector data blocks 422) associated with a decoded frame, because two or more blocks of the frame may share the same motion vector. This may result in empty space 430 at the end of the buffer 320 after the N*16 bytes of motion vector data blocks 422 (where N is the number of motion vectors associated with the decoded frame). In the case where there is no motion vector information for the decoded frame (e.g., the decoded frame is a key frame), the space that is allocated for storing the motion vector data blocks 422 may all instead be empty space 430, and the motion vector count 420 may store a value of zero or NULL.

Figure 5:
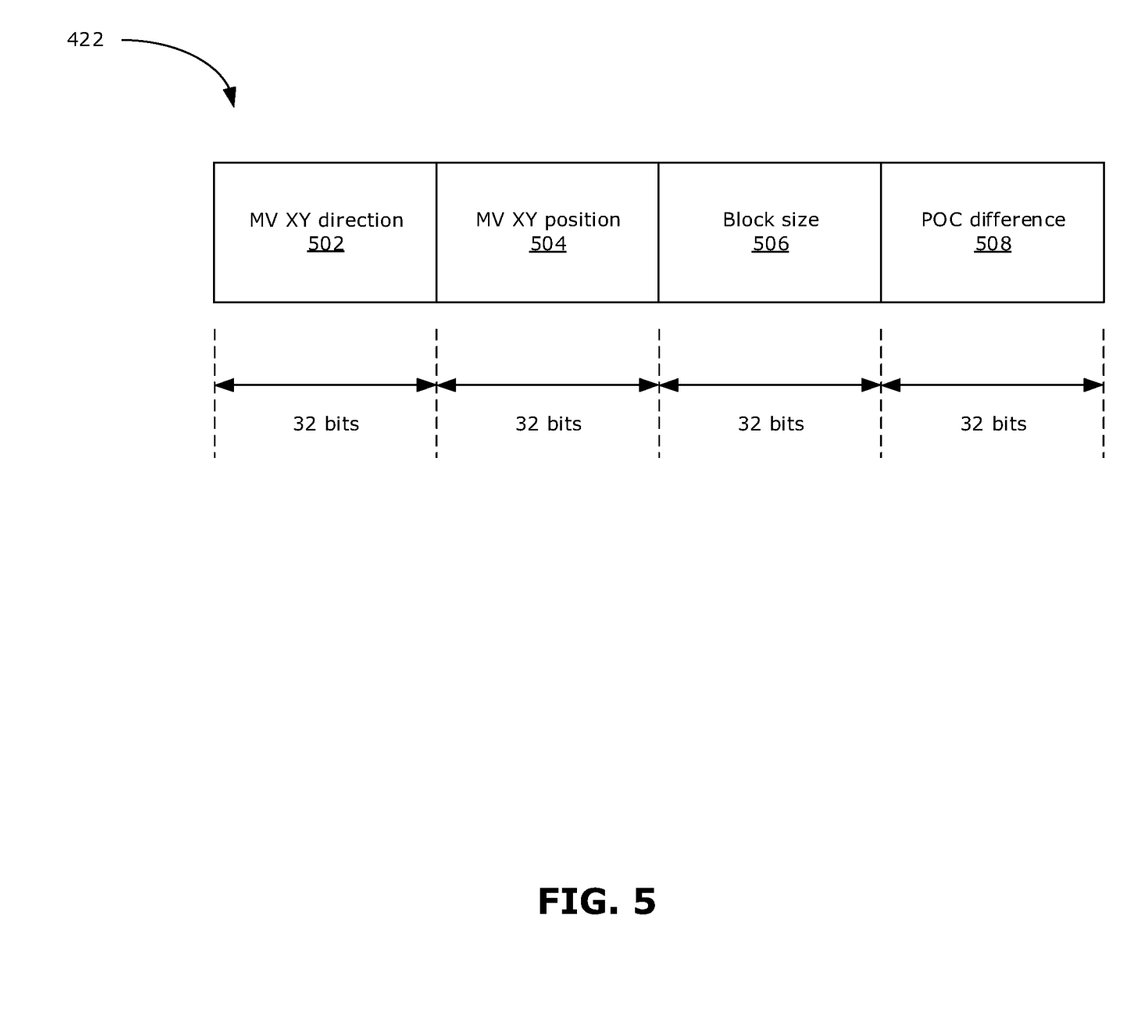
FIG. 5 illustrates an example of the data layout for a single motion vector data block in the example buffer of FIG. 4, in accordance with examples of the present disclosure.

FIG. 5 illustrates an example of the data layout for a single motion vector data block 422 in the buffer 320. In this example, the motion vector data block 422 contains motion vector data that may be formatted in accordance with the H.264 video compression standard. However, this is not intended to be limiting. For example, although certain numbers of bits have been described for the motion vector data block 422, this is only illustrative and may be varied within the scope of the present disclosure. Further, other data layouts may be used for storing motion vector data.

In this example, the motion vector data block 422 is 16 bytes in length, and is partitioned into four sections of data that are each 32 bits in length. Each motion vector data block 422 carries all the required motion vector data for a respective motion vector. Each motion vector data block 422 may contain four blocks of data as shown in FIG. 5 and discussed below.

The motion vector data block 422, in this example, includes a first block of motion vector (MV) XY direction data 502 containing the x-direction component and y-direction component of the motion vector. The x-direction component and y-direction component each requires 16 bits of data, for a total of 32 bits of data.

Following the MV XY direction data 502, the motion vector data block 422 includes a second block of MV XY position data 504 indicating the x-position and y-position of the motion vector in the frame. The x-position and y-position each requires 16 bits of data, for a total of 32 bits of data.

Following the MV XY position data 504, the motion vector data block 422 includes a third block of block size data 506, which indicates the height and width (in pixels) of the block of pixels in the frame corresponding to the motion vector. For example, in accordance with H.264 standard, the size of each block of pixels may be 8×8, which may be indicated by 32 bits of data (e.g., 16 bits of data to indicate height, and 16 bits of data to indicate width).

Following the block size data 506, the motion vector data block 422 includes fourth block of picture order count (POC) difference data 508. The POC difference data 508 indicates the number of frames between the current frame (i.e., the frame associated with this motion vector data block 422) and the reference frame. The POC different data 508 in this example occupies 32 bits of data.

It should be understood that the size of each motion vector data block 422 and the maximum number of motion vector data blocks 422 associated with a frame (and hence the size that should be defined for the buffer 320) may vary depending on the video compression standard used. For example, in the H.265 video compression, a frame is partitioned into prediction units (PUs) instead of 8×8 blocks (as in H.264 standard). Accordingly, the block size data 506 in each motion vector data block 422 may refer to the height and width of the PU.

Further, it should be understood that the data layout described with respect to FIGS. 3 and 4 is not intended to be limiting. Provided the buffer 320 is defined with sufficient storage space to store both decoded image data and motion vector data, and the data layout is properly defined and known to both the video decoder 310 and extraction functions in the SDK 242, different data layouts may be used for storing motion vector data with corresponding decoded image data in the buffer 320.

In practice, the buffer 320 may be defined by the disclosed video decoder 310 in accordance with the framework in FIG. 2. In the framework in FIG. 2, buffer size is defined in the OMX component 250. All decoders 260 that are integrated using the OMX framework are created as an instance of the OMX component 250, which provides a function to define common attributes that all decoders 260 must have (e.g., resolution, format, etc.) as well as all the necessary functions that a decoder 260 in the OMX framework must have. In conventional implementations, the function to define the size of output buffers of an OMX component 250 uses the actual video height/width to allocate the proper buffer size (H*W*1.5), such that the buffer has storage space only sufficient to fit for the data for a decoded image. Accordingly, to define the disclosed buffer 320, the definition of the buffer size may be defined in the function of the disclosed video decoder 310 to include the added storage space as described above.

Example operations of the disclosed video decoder 310 are now described. In the following example, the video decoder 310 may perform decoding of video data that has been compressed in the H.264 format, with capabilities to extract and store motion vector data. However, it should be understood that the video decoder 310 may decode other video compression formats (e.g., H.265 format).

Figure 6:
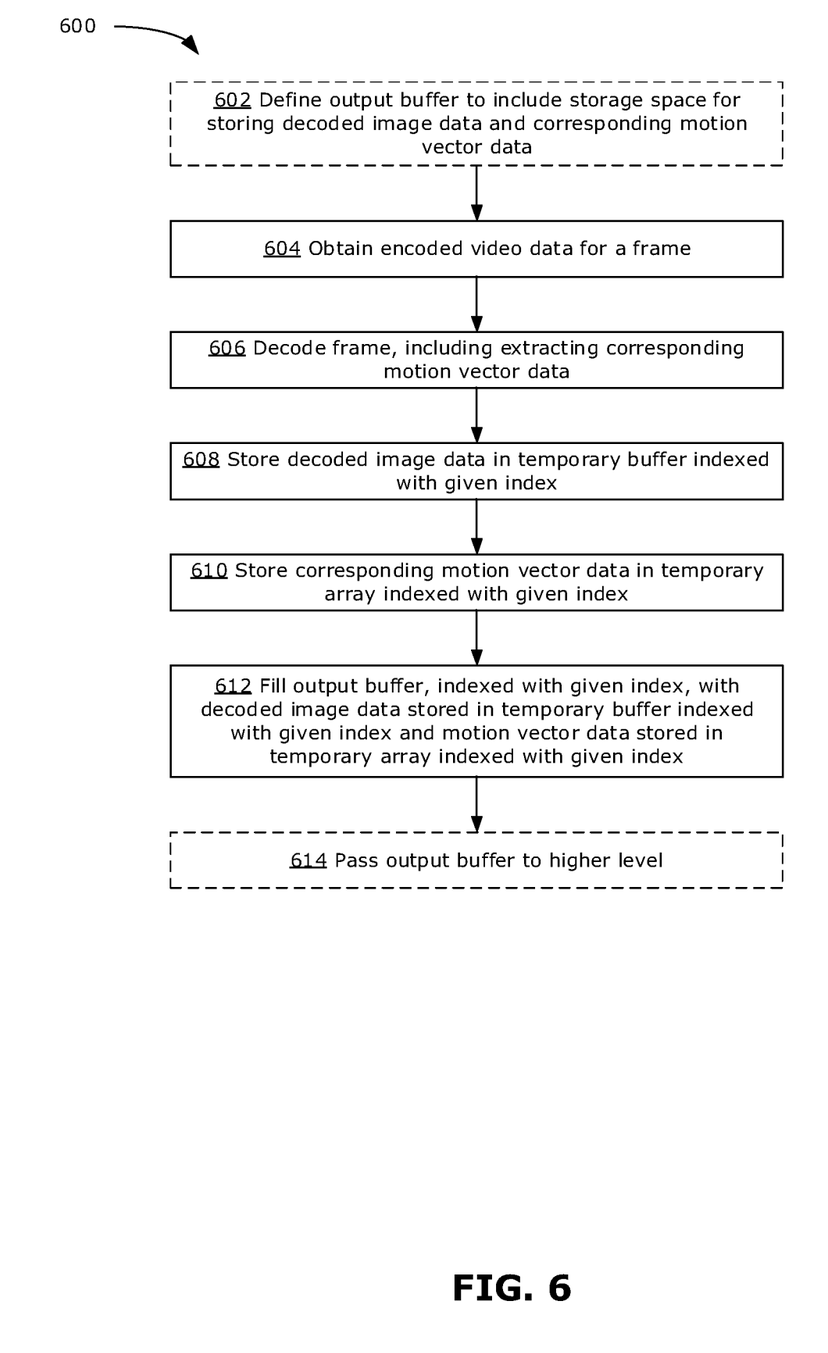
FIG. 6 is a flowchart illustrating an example method for decoding compressed video data, in accordance with examples of the present disclosure.

FIG. 6 is a flowchart illustrating an example method 600 for decoding compressed video data, which may be performed by the electronic device 100 using the disclosed video decoder 310.

Optionally, at 602, the output buffer 320 is defined (e.g., at the time the video decoder 310 is registered and/or initialized). In particular, the output buffer 320 is defined to include storage space for storing decoded image data and the corresponding motion vector data (i.e., the motion vector data that was used to decode the decoded image data). In some examples, step 602 may not be part of the method 600. For example, defining the output buffer 320 may be performed by another function outside of the video decoder 310. Further, the output buffer 320 may be defined prior to receiving any compressed video data to decode.

At 604, encoded video data for a frame is obtained. For example, the encoded video data may be passed to the video decoder 310 in an input buffer. The encoded video data may be in the form of a bitstream for an encoded frame, for example.

At 606, a frame is decoded from the encoded video data. Decoding a frame includes extracting corresponding motion vector data. In the case where there is no corresponding motion vector data (e.g., the decoded frame is a key frame), the step of extracting corresponding motion vector data may be omitted, or a null vector may be extracted as the motion vector data.

It should be noted that the video decoder 310 may perform asynchronous decoding. By asynchronous decoding, it is meant that frames may be decoded out of order (i.e., the sequence in which frames are decoded may be different from the sequence that the frames are ordered in the video). As well, the decoding of a frame may be asynchronous with the passing of the output buffer 320 to store the decoded image data. The video decoder 310 may use an internal index (which may or may not be the same as the frame index corresponding to the location of a frame in the video) to track which decoded image data corresponds with which motion vector data. Further, it is important that the decoded image data and corresponding motion vector data are stored in the output buffer 320 that has the same index. For example, if the video decoder 310 generates decoded image data and corresponding motion vector data that have been assigned index k, the decoded image data and corresponding motion vector data must be outputted in the output buffer 320 having index k. However, the output buffer 320 may not be available at the same time that the decoded image data and corresponding motion vector data is generated by the video decoder 310. To ensure that the correct output buffer 320 is filled with the correct decoded image data and motion vector data, the video decoder 310 may use temporary internal storage.

At 608, the decoded image data is stored in a temporary storage that is internal to the video decoder 310, such as a temporary buffer, that is indexed with a given index (e.g., index k).

At 610, the corresponding motion vector data is stored in a temporary storage that is internal to the video decoder 310, such as a temporary array, that is indexed with the same given index (e.g., index k).

In some examples, rather than storing the decoded image data and corresponding motion vector data in separate temporary buffer and temporary array, both the decoded image data and corresponding motion vector data may be stored in the same temporary storage (e.g., the same temporary buffer in the video decoder 310).

At 612, when the output buffer 320 having the same given index (e.g., index k) is available, the output buffer 320 is filled with the decoded image data that is stored in the temporary buffer having the same given index and with the motion vector data that is stored in the temporary array having the same given index. This helps to ensure that the motion vector data is copied with the correct decoded image data into the correct output buffer 320.

For example, when the output buffer 320 is passed to the video decoder 310, a check of the index of the output buffer 320 may be made. If the index of the output buffer 320 matches the index of a temporary buffer storing decoded image data and temporary array storing motion vector data, then the decoded image data from the temporary buffer having the matching index is copied into the output buffer 320. The motion vector data from the temporary array having the matching index can be copied into the output buffer 320 by accessing the buffer space, following where the decoded image data has been copied, via a pointer to the end of the YUV channel data, for example.

The temporary buffer and temporary array may then be purged, to free up space in the internal memory of the video decoder 310.

Optionally, at 614, the output buffer 320, containing the decoded image data and corresponding motion vector data, may be passed from a lower (or first) system level where the video decoder 310 resides to a higher (or second) system level (e.g., to the OMX component 250). In some examples, passing the output buffer 320 to the higher level may not be part of the operations of the video decoder 310.

The method 600 may be repeated until all frames have been decoded together with corresponding extracted motion vector data, and passed up to higher system levels using the output buffer 320.

The present disclosure also describes example functionality, which may be implemented at the SDK 242. For example, an application programming interface (API) may be implemented at the SDK 242 to read motion vector data from the output buffer 320 and optionally preprocess motion vector data into a format that may be more easily useable by higher level applications (e.g., CV applications). The same (or different) API may also be used to provide the encoded video data to the video decoder 310 via the decoder interface component 240. For example, the SDK 242 may implement an API that is based on the decoder interface component 240, for example an API that may ensure compatibility with any existing Android-based system framework and OMX framework.

Figure 7:
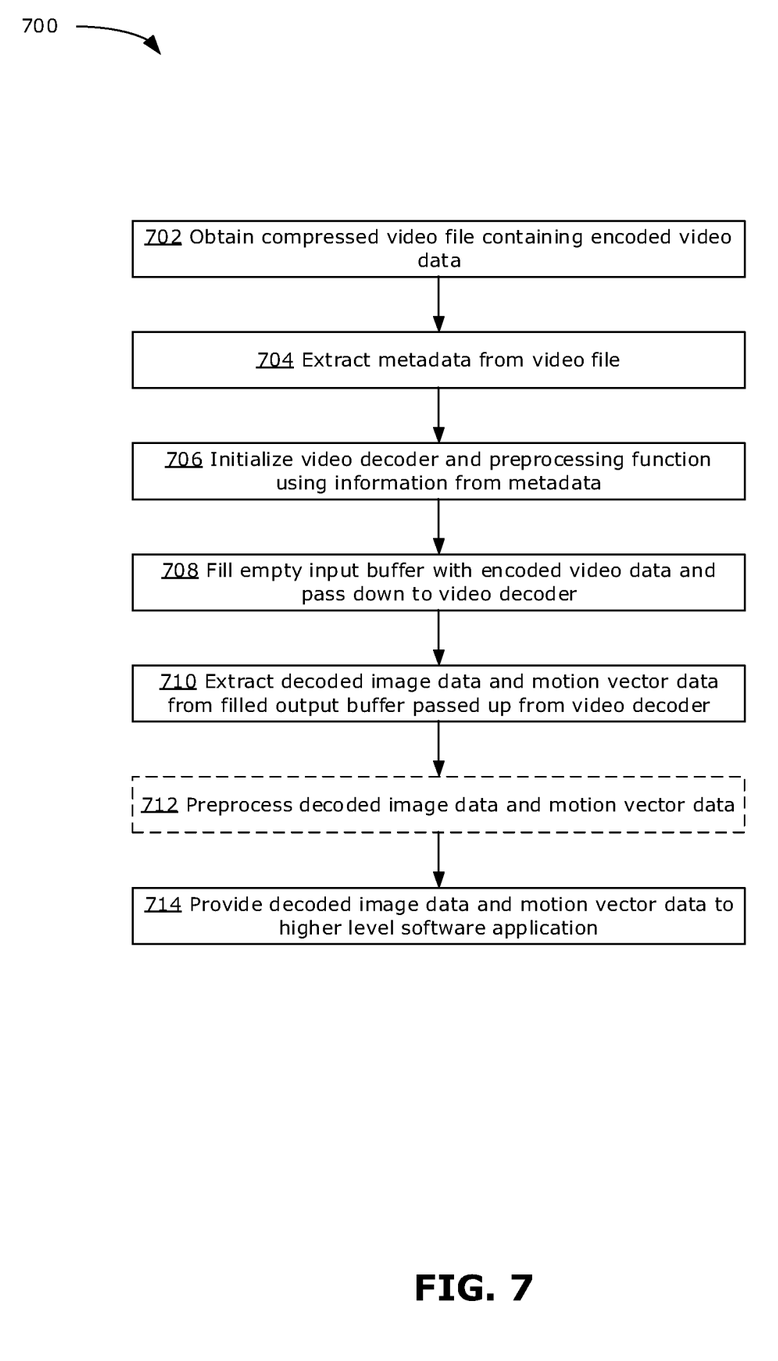
FIG. 7 is a flowchart illustrating an example method for interfacing with an example disclosed video decoder 310, in accordance with examples of the present disclosure.

FIG. 7 is a flowchart illustrating an example method 700 for interfacing with the disclosed video decoder 310, for example using functions of the SDK 242.

At 702, a compressed video file containing encoded video data is obtained. For example, the compressed video file may be provided by a higher level application.

At 704, metadata is extracted from the video file. The extraction of metadata may be performed using an instance of a specific class or an API function (e.g., a video reader function) that is designed for reading an encoded video file. The video reader function may also be used to provide the encoded video data to the video decoder 310 through the decoder interface component 240.

At 706, the video decoder 310 and preprocessing function are initialized. The metadata that was extracted at step 704 may include information that is used to initialize the video decoder 310, such as the video resolution, video codec and framerate. This information from the metadata may be used to initialize the video decoder 310 and the preprocessing at the SDK 242.

After the video decoder 310 and the preprocessing function have been initialized, the system of input buffer/output buffer as described above is used to pass encoded video data to the video decoder 310 and receive decoded video data and motion vector data from the video decoder 310.

At 708, an empty input buffer is filled with raw (i.e., encoded) video data. For example, the empty input buffer may be filled with raw video data corresponding to one encoded frame or may be filled with raw video data corresponding to more than one encoded frame (or any other chunk size of raw video data). For example, the decoder interface component 240 may be used to check if there is any empty input buffer that can be used to pass data to the video decoder 310. When an empty input buffer is identified, the input buffer may be filled with encoded video data (e.g., using the instance of the video reader function created at the setup of the decoding process). The filled input buffer is then passed down to the lower level video decoder 310.

At 710, decoded image data and motion vector data is extracted from a filled output buffer 320. The decoder interface component 240 may be used to check if there is any filled output buffer 320 containing data passed up from the video decoder 310. If there is a filled output buffer 320, the data stored therein may be extracted (e.g., using the video reader function).

It should be understood that checking for empty input buffer and checking for filled output buffer 320 may be performed together as a single operation, rather than in separate steps as shown in FIG. 7.

Optionally, at 712, the data extracted from the filled output buffer 320 may be preprocessed. Preprocessing the decoded image data and motion vector data may help to format at least the motion vector data into a format that may be more easily processed by higher level software applications (e.g., CV applications). Further, by performing the preprocessing at the SDK 242, higher level software applications may not need to be aware of how the motion vector data was obtained or the original format of the motion vector data extracted from the encoded video data. In other words, preprocessing that is performed at the SDK level may enable higher level software applications to be agnostic about the lower level operations of the video decoder 310, which may help to simplify development of higher level software applications and/or avoid restricting higher level software applications to using a specific video decoder 310.

Preprocessing the decoded image data and motion vector data may involve first splitting the output buffer 320 into a first buffer containing the decoded image data and a second buffer containing the motion vector data. The first buffer thus contains the image data for a decoded frame, for example in YUV format. Many existing CV applications are designed to accept image data in RGB format. Accordingly, preprocessing may involve converting the image data from YUV format to RGB format. Any suitable image processing function may be used to perform this conversion, such as software tools provided by the OpenCV library.

The second buffer contains the corresponding motion vector data. Many existing CV applications are designed to accept input data in matrix form. Accordingly, the motion vector data may be formatted from the motion vector data blocks 422 (e.g., as shown in FIG. 4) into a matrix, based on the x- and y-positions of each motion vector (e.g., as indicated in the MV XY position data 504 shown in FIG. 5). The resulting motion vector matrix may be further preprocessed, for example depending on the requirements of the CV application that is the intended recipient of the motion vector matrix. For example, interpolation may be performed to fill in any blank spaces in the motion vector matrix, downscaling may be performed to create a lower resolution version of the motion vector matrix and/or accumulation may be performed to combine motion vector data corresponding to multiple frames into a single cumulative motion vector matrix. The resulting motion vector matrix may be used as input data by a CV application. Any suitable 2D data processing function may be used to preprocess the motion vector data, such as software tools provided by the OpenGL API.

In some examples, other preprocessing operations may be performed. For example, if a different data layout is used to store decoded image data and motion vector data in the output buffer, the preprocessing operations may be adapted accordingly. In another example, different preprocessing operations may be performed according to the requirements of the software application that will be using the image data and motion vector data.

It should be understood that preprocessing of the decoded image data and preprocessing of the motion vector data may be performed in parallel or in any order and is not necessarily limited to the order of steps illustrated in FIG. 7.

At 714, the decoded image data and corresponding motion vector data for a decoded frame may be provided (exported) for use by higher level software applications (e.g., CV applications).

The method 700 may be repeated until all frames of a video have been decoded and optionally preprocessed.

Using examples of the present disclosure, motion vector data that is conventionally discarded may be extracted and stored by a lower level video decoder, and made available for use by higher level software applications. This may enable software applications, in particular CV applications, to more efficiently make use of motion vector data. In the case of CV applications, having access to the motion vector data may reduce the complexity and/or improve the efficiency of CV applications, enabling CV applications to be executed by electronic devices (e.g., mobile devices such as smartphones, tablets, etc.) that have limited processing resources.

The present disclosure also describes an example video decoder that performs operations to ensure that motion vector data is extracted during the decoding process of each frame is stored (rather than discarded) and is outputted to the appropriate output buffer together with the corresponding decoded image data for the same frame. This helps to ensure that the motion vector data is reliably stored and accessible to higher system levels.

The present disclosure describes an example output buffer, which has been defined with additional storage space to store the motion vector data together with the decoded image data corresponding to a decoded frame of video. An example data layout has also been described. The example data layout may provide a standard placement for each relevant piece of information for a motion vector. For example, the data stored in the data layout may be useful for determining the position, frame, macroblock and direction of each motion vector associated with a given decoded frame.

The present disclosure also describes example preprocessing operations, which may be implemented at the SDK level, to enable the decoded image data with corresponding motion vector data to be preprocessed into formats that may be more readily useable (e.g., by CV applications). The preprocessing may help to ensure that the decoded image data with corresponding motion vector data is in a format that is consistent, regardless of the specific video decoder used. This may enable the present disclosure to be generalized to different video compression standards.

Although examples of the present disclosure have referred to decoding compressed video data in the H.264 format, the present disclosure may also be implemented for decoding of compressed video in the H.265 format, among other possibilities. As described above, different data may be stored in the motion vector data block, depending on the video compression format.

Further, the disclosed video decoder may support multi-thread processing (e.g., similar to the multi-thread processing supported by existing H.265 video decoders). The decoding process may be carried in multiple parallel threads, however the storing of motion vector data into a temporary array may be carried out one thread at a time, to avoid inadvertently overwriting or mixing of motion vector data from multiple different decoding threads.

It should be understood that the present disclosure may be generalized and adapted for various compression formats which carry motion vector data. The present disclosure may be used to adapt various hardware or software decoders for various video codec standards.

Examples of the present disclosure may be implemented on any electronic device (e.g., any mobile device, such as smartphones or tablets), and may be useful to improve the efficiency of any software application (e.g., CV application) that processes video data. Examples of the present disclosure may be implemented in any electronic device that employs a system framework based on, or similar to, the framework as illustrated in FIG. 2, for example. However, it should be understood that examples of the present disclosure may be implemented in any other suitable system framework having logically separated system levels.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. An electronic device, comprising:
  a non-transitory memory; and
  a processing unit configured to execute instructions stored in the non-transitory memory to cause the device to:
    obtain, at a video decoder, encoded video data for a frame of video from an input buffer;
    decode, using the video decoder, the encoded video data to obtain decoded image data for a decoded frame, wherein the decoding includes extracting corresponding motion vector data for the decoded frame, the corresponding motion vector data including one or more motion vector data blocks each containing information for a respective motion vector for the decoded frame;
    store, using the video decoder, the decoded image data in a temporary storage indexed with a given index, and store, using the video decoder, the corresponding motion vector data in a same or different temporary storage indexed with the given index;
    fill, using the video decoder, an output buffer indexed with the given index with the decoded image data and the corresponding motion vector data stored in the respective temporary storage indexed with the given index, the output buffer being defined to have storage space for storing the decoded image data together with the corresponding motion vector data; and
    pass the filled output buffer with the decoded image data and corresponding motion vector data from a first system level of the device where the video decoder is implemented to a second system level of the device;
  wherein each motion vector data block contains:
    a first block of motion vector x- and y-direction data;
    a second block of motion vector x- and y-position data;
    a third block of size data; and
    a fourth block of picture order count difference data.

2. The device of claim 1, wherein the video decoder is implemented at the first system level of the device that is a lower system level of the device, and wherein the filled output buffer is passed to the second system level of the device that is a higher system level of the device.

3. The device of claim 2, wherein the processing unit is configured to execute instructions stored in the non-transitory memory to further cause the device to:
  obtain, at an interface component at the second system level, the filled output buffer;
  extract, using the interface component, the decoded image data and corresponding motion vector data for the decoded frame from the filled output buffer;
  preprocess, using the interface component, the decoded image data and corresponding motion vector data; and
  provide, after the preprocessing, the decoded image data and corresponding motion vector data to a software application.

4. The device of claim 3, wherein preprocessing the decoded image data and corresponding motion vector data comprises:
  preprocessing the decoded image data from YUV format to RGB format; and
  preprocessing the corresponding motion vector data into matrix format.

5. The device of claim 3, wherein the processing unit is configured to execute instructions stored in the non-transitory memory to further cause the device to:
  obtain, at the interface component, a compressed video file containing the encoded video data;
  fill, using the interface component, the input buffer with the encoded video data; and
  pass the filled input buffer to the video decoder at the first system level of the device.

6. The device of claim 3, wherein the decoded image data and corresponding motion vector data are provided to a computer vision application.

7. The device of claim 1, wherein the device is a mobile device.

8. A method, at an electronic device, comprising:
  obtaining, at a video decoder of the electronic device, encoded video data for a frame of video from an input buffer;
  decoding, using the video decoder, the encoded video data to obtain decoded image data for a decoded frame, wherein the decoding includes extracting corresponding motion vector data for the decoded frame, the corresponding motion vector data including one or more motion vector data blocks each containing information for a respective motion vector for the decoded frame;
  storing, using the video decoder, the decoded image data in a temporary storage indexed with a given index, and storing, using the video decoder, the corresponding motion vector data in a same or different temporary storage indexed with the given index;
  filling, using the video decoder, an output buffer indexed with the given index with the decoded image data and the corresponding motion vector data stored in the respective temporary storage indexed with the given index, the output buffer being defined to have storage space for storing the decoded image data together with the corresponding motion vector data; and passing the filled output buffer with the decoded image data and corresponding motion vector data from a first system level of the device where the video decoder is implemented to a second system level of the device;

wherein each motion vector data block contains:
a first block of motion vector x- and y-direction data;
a second block of motion vector x- and y-position data;
a third block of size data; and
a fourth block of picture order count difference data.

9. The method of claim 8, wherein the video decoder is implemented at the first system level of the device that is a lower system level of the device, and wherein the filled output buffer is passed to the second system level of the device that is a higher system level of the device.

10. The method of claim 9, further comprising:
obtaining, at an interface component at the second system level, the filled output buffer;
extracting, using the interface component, the decoded image data and corresponding motion vector data for the decoded frame from the filled output buffer;
preprocessing, using the interface component, the decoded image data and corresponding motion vector data; and
providing, after the preprocessing, the decoded image data and corresponding motion vector data to a software application.

11. The method of claim 10, wherein preprocessing the decoded image data and corresponding motion vector data comprises:
preprocessing the decoded image data from YUV format to RGB format; and
preprocessing the corresponding motion vector data into matrix format.

12. The method of claim 10, further comprising:
obtaining, at the interface component, a compressed video file containing the encoded video data;
filling, using the interface component, the input buffer with the encoded video data; and
passing the filled input buffer to the video decoder at the first system level of the device.

13. The method of claim 10, wherein the decoded image data and corresponding motion vector data are provided to a computer vision application.

14. A non-transitory computer readable medium having instructions stored thereon, wherein the instructions, when executed by a processing unit of an electronic device, cause the electronic device to:
obtain, at a video decoder of the electronic device, encoded video data for a frame of video from an input buffer;
decode, using the video decoder, the encoded video data to obtain decoded image data for a decoded frame, wherein the decoding includes extracting corresponding motion vector data for the decoded frame, the corresponding motion vector data including one or more motion vector data blocks each containing information for a respective motion vector for the decoded frame;
store, using the video decoder, the decoded image data in a temporary storage indexed with a given index, and store, using the video decoder, the corresponding motion vector data in a same or different temporary storage indexed with the given index;
fill, using the video decoder, an output buffer indexed with the given index with the decoded image data and the corresponding motion vector data stored in the respective temporary storage indexed with the given index, the output buffer being defined to have storage space for storing the decoded image data together with the corresponding motion vector data; and
pass the filled output buffer with the decoded image data and corresponding motion vector data from a first system level of the device where the video decoder is implemented to a second system level of the device;

wherein each motion vector data block contains:
a first block of motion vector x- and y-direction data;
a second block of motion vector x- and y-position data;
a third block of size data; and
a fourth block of picture order count difference data.

15. The non-transitory computer readable medium of claim 14, wherein the video decoder is implemented at the first system level of the device that is a lower system level of the device, and wherein the filled output buffer is passed to the second system level of the device that is a higher system level of the device.

16. The non-transitory computing readable medium of claim 15, wherein the instructions when executed by the processing unit of the electronic device further cause the electronic device to:
obtain, at an interface component at the second system level, the filled output buffer;
extract, using the interface component, the decoded image data and corresponding motion vector data for the decoded frame from the filled output buffer;
preprocess, using the interface component, the decoded image data and corresponding motion vector data; and
provide, after the preprocessing, the decoded image data and corresponding motion vector data to a software application.

17. The non-transitory computing readable medium of claim 16, wherein preprocessing the decoded image data and corresponding motion vector data comprises:
preprocessing the decoded image data from YUV format to RGB format; and
preprocessing the corresponding motion vector data into matrix format.

18. The non-transitory computing readable medium of claim 16, wherein the instructions when executed by the processing unit of the electronic device further cause the electronic device to:
obtain, at the interface component, a compressed video file containing the encoded video data;
fill, using the interface component, the input buffer with the encoded video data; and
pass the filled input buffer to the video decoder at the first system level of the device.

19. The non-transitory computing readable medium of claim 16, wherein the decoded image data and corresponding motion vector data are provided to a computer vision application.

20. The non-transitory computing readable medium of claim 14, wherein the electronic device is a mobile device.

* * * * *